United States Patent
Haseyama

(10) Patent No.: US 11,366,331 B2
(45) Date of Patent: Jun. 21, 2022

(54) BEAM CONVERTING OPTICAL SYSTEM AND LIGHT SOURCE DEVICE

(71) Applicant: Panasonic Intellectual Property Management Co., Ltd., Osaka (JP)

(72) Inventor: Ryo Haseyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 234 days.

(21) Appl. No.: 16/652,151

(22) PCT Filed: Nov. 21, 2018

(86) PCT No.: PCT/JP2018/042933
§ 371 (c)(1),
(2) Date: Mar. 30, 2020

(87) PCT Pub. No.: WO2019/111705
PCT Pub. Date: Jun. 13, 2019

(65) Prior Publication Data
US 2020/0249487 A1 Aug. 6, 2020

(30) Foreign Application Priority Data
Dec. 5, 2017 (JP) .............................. JP2017-232995

(51) Int. Cl.
*G02B 27/09* (2006.01)

(52) U.S. Cl.
CPC ................................ *G02B 27/0955* (2013.01)

(58) Field of Classification Search
CPC ............ G02B 27/0955; G02B 19/0014; G02B 27/0966; G02B 27/0927
See application file for complete search history.

(56) References Cited

U.S. PATENT DOCUMENTS

| | | | |
|---|---|---|---|
| 6,552,302 B2 * | 4/2003 | Matsushita | G11B 5/102 219/121.66 |
| 2004/0104339 A1 * | 6/2004 | Takakubo | G02B 26/124 250/234 |
| 2018/0120434 A1 * | 5/2018 | Jeong | G01S 7/4816 |

FOREIGN PATENT DOCUMENTS

JP    2011-187968    9/2011

OTHER PUBLICATIONS

International Search Report of PCT application No. PCT/JP2018/042933 dated Feb. 5, 2019.

* cited by examiner

*Primary Examiner* — Muhammad N Edun
(74) *Attorney, Agent, or Firm* — McDermott Will & Emery LLP

(57) ABSTRACT

The present disclosure provides a beam converting optical system that is small and has high divergence angle, and provides a light source device. Beam converting optical system according to an aspect of the present disclosure includes first optical element and second optical element. First optical element is a cylindrical lens. The cylindrical lens of first optical element has first optical surface and second optical surface. First optical surface has positive refractive power. Second optical element is a cylindrical lens. The cylindrical lens of second optical element has third optical surface and fourth optical surface. Third optical surface has negative refractive power. Laser beam converges at focal area. Focal area is between first optical element and second optical element.

16 Claims, 4 Drawing Sheets

BEAM CONVERTING OPTICAL SYSTEM AND LIGHT SOURCE DEVICE

CROSS-REFERENCE TO RELATED APPLICATIONS

This application is a U.S. national stage application of the PCT International Application No. PCT/JP2018/042933 filed on Nov. 21, 2018, which claims the benefit of foreign priority of Japanese patent application 2017-232995 filed on Dec. 5, 2017, the contents all of which are incorporated herein by reference.

FIELD OF THE INVENTION

The present disclosure relates to a beam converting optical system that converts light intensity distribution of a laser beam emitted from a light source, and converts the laser beam into a line beam. Further, the present disclosure relates to a light source device.

DESCRIPTION OF THE RELATED ART

In recent years, beam converting optical systems that each convert a laser beam emitted from a light source into a line beam have been examined. A conventional beam converting optical system is disclosed in PTL 1, for example. The beam converting optical system disclosed in PTL 1 is an afocal optical system. The beam converting optical system disclosed in PTL 1 includes a divergent element and a homogenizer. The divergent element is disposed after a light source, and increases a divergent angle of a laser beam. After the divergent element, the homogenizer is disposed and converts light intensity. The divergent element includes a concave lens and a convex lens. The homogenizer is a cylindrical lens array.

CITATION LIST

Patent Literature

PTL 1: Unexamined Japanese Patent Publication No. 2011-187968

SUMMARY OF THE INVENTION

Miniaturization of such beam converting optical systems is strongly needed. However, conventional beam converting optical systems are each an afocal optical system in which a homogenizer is disposed after a divergent element. Therefore, to increase a divergence angle of the divergent element, a plurality of concave lenses need to be arranged along an optical axis. Therefore, the conventional beam converting optical systems are large.

An object of the present disclosure is to solve the above problem, and to provide a beam converting optical system that is small and has a large divergence angle, and to provide a light source device.

A beam converting optical system according to an aspect of the present disclosure includes a first optical element, and a second optical element disposed after the first optical element. The first optical element is a cylindrical lens. The cylindrical lens of the first optical element has a first optical surface and a second optical surface. The first optical surface has positive refractive power. The second optical element is a cylindrical lens. The cylindrical lens of the second optical element has a third optical surface and a fourth optical surface. The third optical surface has negative refractive power. A focal area is between the first optical element and the second optical element. A laser beam converges at the focal area.

A light source device according to an aspect of the present disclosure includes: a light source that emits a laser beam; and a beam converting optical system that converts light intensity distribution of the laser beam, and converts the laser beam into a line beam. The beam converting optical system includes a first optical element, and a second optical element disposed after the first optical element. The first optical element is a cylindrical lens. The cylindrical lens of the first optical element has a first optical surface and a second optical surface. The first optical surface has positive refractive power. The second optical element is a cylindrical lens. The cylindrical lens of the second optical element has a third optical surface and a fourth optical surface. The third optical surface has negative refractive power. The laser beam converges at a focal area. The focal area is between the first optical element and the second optical element.

Due to the above configuration, the present disclosure provides a beam converting optical system that is small and has a large divergence angle, and provides a light source device.

DETAILED DESCRIPTION OF THE PREFERRED EMBODIMENTS

Figure 1A:
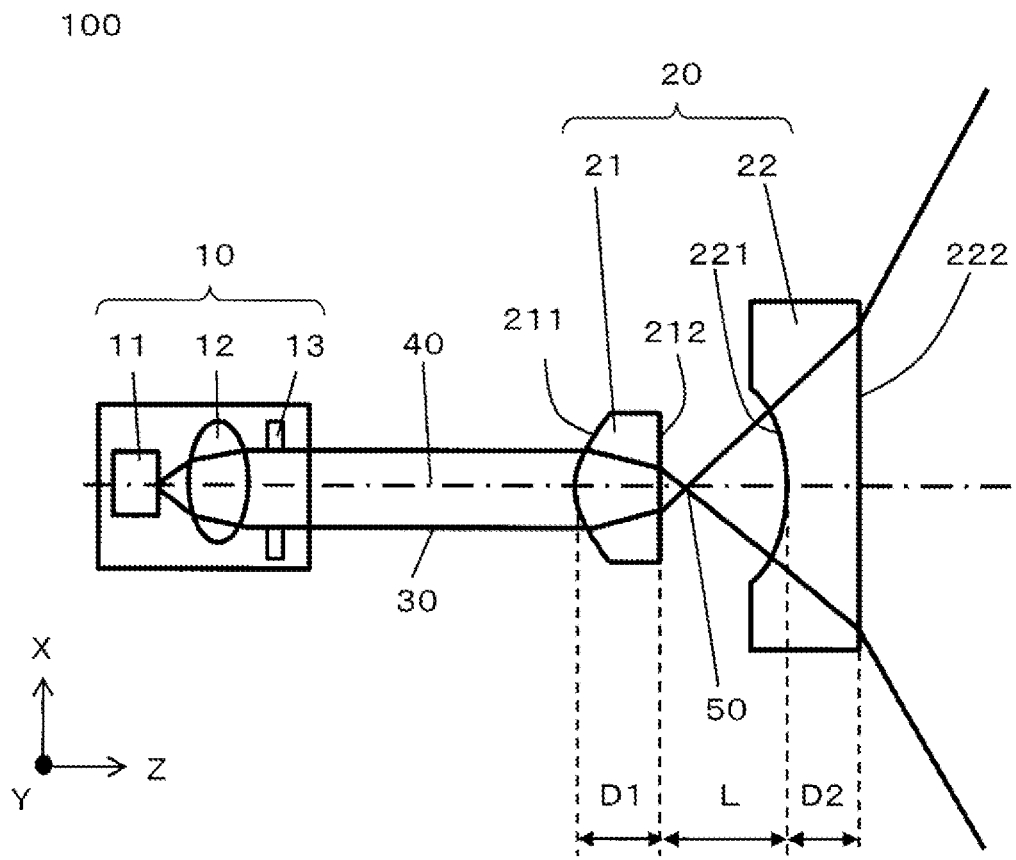
FIG. 1A is a schematic top view of a main part of a light source device according to an exemplary embodiment of the present disclosure.

Hereinafter, a light source device that includes a beam converting optical system according to an exemplary embodiment of the present disclosure will be described with reference to the drawings. The following exemplary embodiment shows a preferred specific example of the present disclosure. Therefore, the following exemplary embodiment shows examples of shapes, components, an arrangement of the components, and a way how the components are connected together. Further, it is not intended that the following exemplary embodiment limit the present disclosure. Therefore, some components in the following exemplary embodiment are arbitrary components if the components are not recited in independent claims that disclose the respective most generic concepts of the present invention.

Further, the drawings are schematic views and are not necessarily accurately drawn. The same reference marks are assigned to the substantially same structures in the drawings. Explanation for the substantially same structures will not be repeated or described briefly.

Figure 1B:
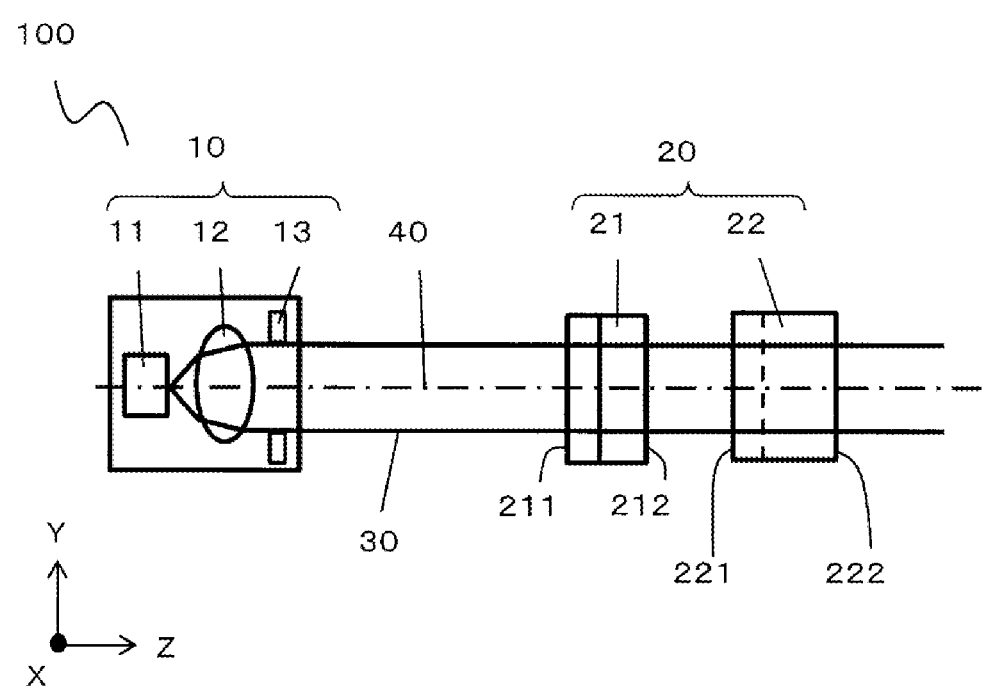
FIG. 1B is a schematic side view of the main part of the light source device according to the exemplary embodiment of the present disclosure.

Hereinafter, a light source device according to an aspect of the present disclosure will be described with reference to the drawings. FIGS. 1A and 1B illustrate a main part of light source device 100. FIG. 1A is a schematic top view of light source device 100. FIG. 1B is a schematic side view of light source device 100.

Light source device 100 includes light source 10 and beam converting optical system 20.

Light source 10 contains laser 11 and collimating lens 12. Laser beam 30 emitted from laser 11 is converted into a bundle of parallel rays by collimating lens 12. That is to say, laser beam 30 emitted from light source 10 is the bundle of parallel rays. Light source 10 may include diaphragm 13 after collimating lens 12. Diaphragm 13 limits a diameter of the bundle of rays of laser beam 30 emitted from collimating lens 12.

Beam converting optical system 20 includes first optical element 21 and second optical element 22. Light source device 100 includes light source 10, first optical element 21, and second optical element 22 that are arranged in this order along a Z axis.

First optical element 21 is a cylindrical lens that has positive refractive power. If an optical element has the positive refractive power, the optical element converges light that has passed through the optical element. Further, if an optical element has negative refractive power, the optical element diverges light that has passed through the optical element. First optical element 21 has first optical surface 211 where laser beam 30 enters, and second optical surface 212 where laser beam 30 exits. First optical surface 211 is a cylindrical surface. The cylindrical surface is convex and has positive refractive power along an X axis. Second optical surface 212 is a plane that has no refractive power along the X axis. The cylindrical surface of first optical surface 211 is aspheric. Since first optical surface 211 is aspheric, Gaussian light intensity distribution of laser beam 30 is converted into top-flat light intensity distribution. The top-flat light intensity distribution is uniform light intensity distribution within a predetermined range of an image height. A center of the predetermined range of an image height is optical axis 40. For example, the predetermined range of an image height may be less than or equal to 70% of the image height. The uniform light intensity distribution means that, within the predetermined range of an image height, a smallest value of light intensity is greater than or equal to 90% of a largest value of light intensity. Second optical surface 212 may be a cylindrical surface that has refractive power.

Preferably, first optical element 21 is made of optical glass. Optical glass is usable for laser beam 30 that has high power.

Second optical element 22 is a cylindrical lens that has negative refractive power. Second optical element 22 has third optical surface 221 where laser beam 30 enters, and fourth optical surface 222 where laser beam 30 exits. Third optical surface 221 is a cylindrical surface. The cylindrical surface is concave and has negative refractive power along the X axis. Fourth optical surface 222 is a plane that has no refractive power along the X axis. The cylindrical surface of third optical surface 221 is aspheric. Since third optical surface 221 is aspheric, Gaussian light intensity distribution of laser beam 30 is converted into top-flat light intensity distribution. Fourth optical surface 222 may be a cylindrical surface that has refractive power.

Preferably, second optical element 22 is made of optical glass. Optical glass is usable for laser beam 30 that has high power.

A non-power axis of first optical surface 211 aligns with a non-power axis of third optical surface 221. The alignment between the non-power axes allows misalignment between the non-power axes if optical properties of light source device 100 are obtained. A range within which misalignment between the non-power axis of first optical surface 211 and the non-power axis of third optical surface 221 is allowed may be ±0.3°.

If first optical element 21 does not sufficiently convert intensity of beam, the insufficiency is compensated by second optical element 22.

Next, changes in laser beam 30 emitted from light source 10 will be described. As illustrated in FIG. 1A, laser beam 30 emitted from light source 10 passes through first optical element 21. Consequently, laser beam 30 is converted into a bundle of converged rays. Laser beam 30 that has become the bundle of converged rays passes through focal area 50. Then laser beam 30 becomes a bundle of diverged rays. At focal area 50, the bundle of converged rays that has exited first optical element 21 has a smallest diameter that becomes a beam waist. Laser beam 30 passes through focal area 50 and becomes the bundle of diverged rays. Then a divergence angle of laser beam 30 is increased by second optical element 22. First optical element 21 does not have refractive power along the non-power axis of first optical element 21. Further, second optical element 22 does not have refractive power along the non-power axis of second optical element 22. Therefore, as illustrated in FIG. 1B, even after laser beam 30 has passed through first optical element 21 and second optical element 22, a diameter of the bundle of rays does not change along the Y axis. Therefore, laser beam 30 that has been emitted from light source 10 is converted into a line beam. The line beam is expanded along the X axis. Beam converting optical system 20 converts laser beam 30 that has passed through beam converting optical system 20 into the line beam.

In beam converting optical system 20, an aspheric shape of first optical element 21 converts light intensity, and an aspheric shape of second optical element 22 converts light intensity. Consequently, laser beam 30 that has exited beam converting optical system 20 has top-flat light intensity distribution.

Next, an example of design of beam converting optical system 20 will be described. In the example of design, distance L between first optical element 21 and second optical element 22 is 2.4236195 mm along the optical axis. Laser beam 30 that will enter the beam converting elements has a wavelength of 1 μm.

Table 1 shows optical design data of first optical element 21.

TABLE 1

Refractive index 1.67932974
Thickness of element 0.8 mm

| | | First optical surface | Second optical surface |
|---|---|---|---|
| Optical constants | Radius of curvature | 0.6113968 | ∞ |
| | Conic constant | −0.2794994 | — |
| | Fourth order aspheric coefficient | −0.41703976 | — |
| | Sixth order aspheric coefficient | −4.2273587 | — |

TABLE 1-continued

Refractive index 1.67932974
Thickness of element 0.8 mm

| | First optical surface | Second optical surface |
|---|---|---|
| Eighth order aspheric coefficient | 10.779126 | — |
| Tenth order aspheric coefficient | −8.228924 | — |

"Refractive index" in Table 1 is a refractive index for laser beam 30 that has a wavelength of 1 μm. "Thickness of element" in Table 1 is thickness D1 of first optical element 21 in FIG. 1A. The thickness is along an optical axis.

Table 2 shows optical design data of second optical element 22.

TABLE 2

Refractive index 1.5075022
Thickness of element 0.5 mm

| | | Third optical surface | Fourth optical surface |
|---|---|---|---|
| Optical constants | Radius of curvature | −0.7002913 | ∞ |
| | Conic constant | −1.69935 | — |
| | Fourth order aspheric coefficient | — | — |
| | Sixth order aspheric coefficient | — | — |
| | Eighth order aspheric coefficient | — | — |
| | Tenth order aspheric coefficient | — | — |

"Refractive index" in Table 2 is a refractive index for laser beam 30 that has a wavelength of 1 μm. "Thickness of element" in Table 2 is thickness D2 of second optical element 22 in FIG. 1A. The thickness is along the optical axis.

Figure 2:
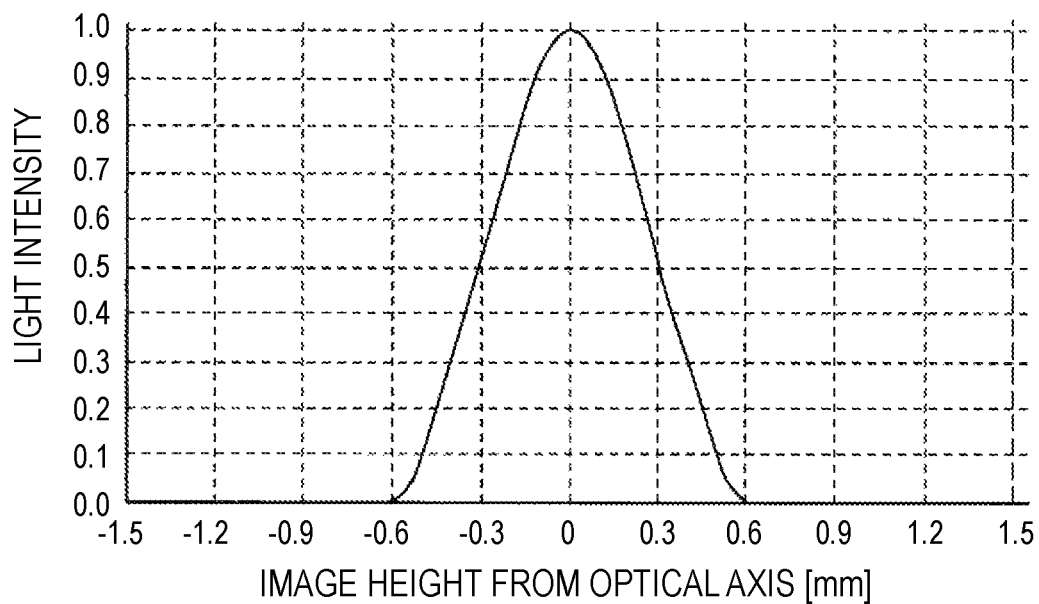
FIG. 2 illustrates light intensity distribution of a laser beam that will enter a beam converting optical system according to an example of design of the present disclosure.

FIG. 2 illustrates light intensity distribution of laser beam 30 that will enter beam converting optical system 20 according to the example of design. A vertical axis represents light intensity. Values of the vertical axis are ratios relative to a largest value of light intensity. A horizontal axis represents image height from an optical axis. FIG. 2 shows that laser beam 30 that will enter beam converting optical system 20 has a diameter of a bundle of rays of 1.2 mm and Gaussian light intensity distribution.

Figure 3:
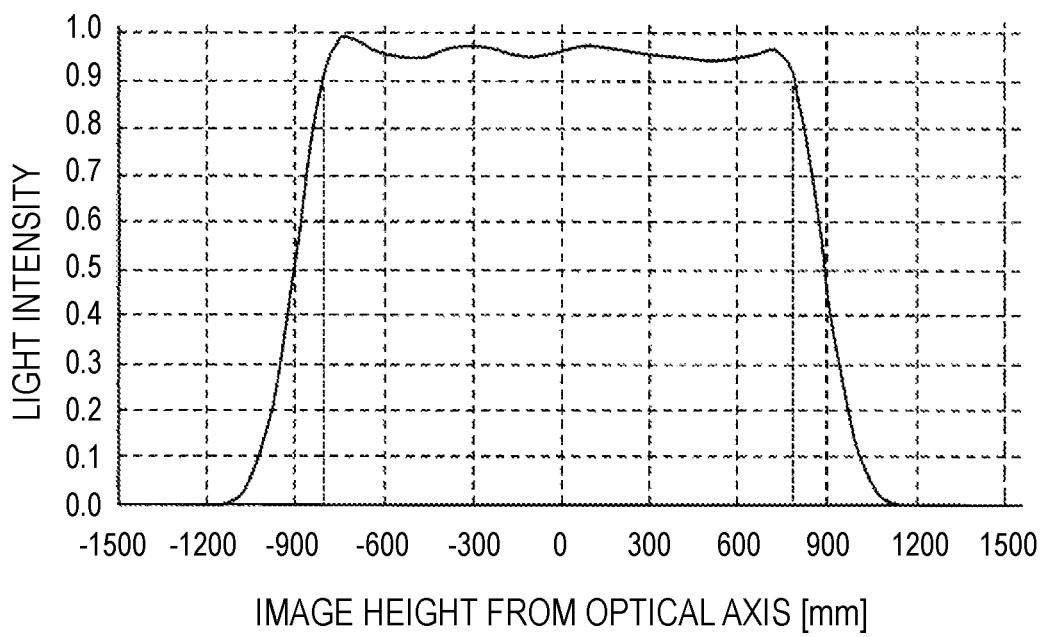
FIG. 3 illustrates light intensity distribution of a laser beam that has exited the beam converting optical system according to the example of design of the present disclosure.

FIG. 3 illustrates light intensity distribution of laser beam 30 that has exited beam converting optical system 20 according to the example of design. The light intensity distribution is measured at a position that is 1,000 mm apart from the fourth optical surface 222 of second optical element 22. A vertical axis represents light intensity. Values of the vertical axis are ratios relative to a largest value of light intensity. A horizontal axis represents image height from optical axis 40. FIG. 3 shows that laser beam 30 that has exited beam converting optical system 20 is converted into a line beam that has uniform light intensity distribution across a range of approximately 1,600 mm. A center of the range is optical axis 40.

Figure 4:
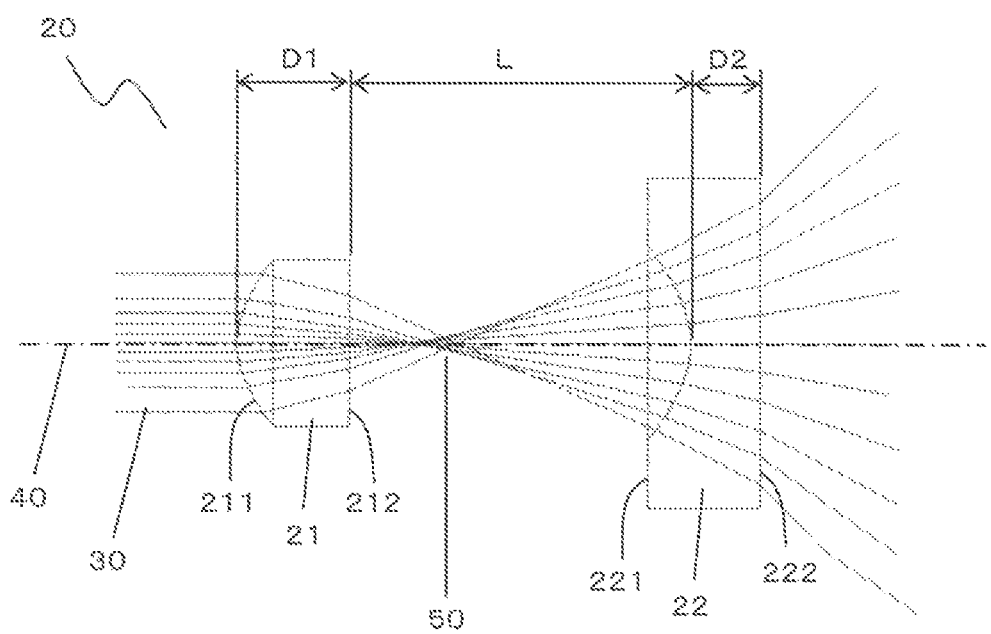
FIG. 4 illustrates rays of a laser beam that enters the beam converting optical system according to the example of design of the present disclosure.

FIG. 4 illustrates rays of laser beam 30 that enters the beam converting elements. Intervals between lines in laser beam 30 correspond to the light intensity distribution. If the intervals between lines are narrow, the light intensity distribution is dense. Alternatively, if the intervals between rays are wide, the light intensity distribution is sparse. FIG. 4 shows that laser beam 30 that will enter first optical element 21 has Gaussian light intensity distribution. That is to say, the closer to the optical axis, light intensity of laser beam 30 that will enter first optical element 21 becomes higher. In other words, the closer to an outer edge of laser beam 30 that will enter first optical element 21, light intensity of laser beam 30 that will enter first optical element 21 becomes lower. FIG. 4 shows that laser beam 30 that has exited second optical element 22 has uniform light intensity distribution in which intervals of lines are uniform from near the optical axis to an outer edge of laser beam 30.

Further, first optical element 21 has longitudinal spherical aberration by aspheric design. The longitudinal spherical aberration is determined in such a manner that, in laser beam 30 that has exited first optical element 21, rays of laser beam 30 that are closer to the optical axis become more parallel to rays of laser beam 30 that are closer to an outer edge of laser beam 30. Second optical element 22 has longitudinal spherical aberration by aspheric design. The longitudinal spherical aberration is determined in such a manner that, in laser beam 30 that has exited second optical element 22, intervals of rays of laser beam 30 become smaller.

As described above, laser beam 30 that has exited first optical element 21 of beam converting optical system 20 according to the present disclosure is converged. A convergence angle of rays of laser beam 30 that are at an outer edge of laser beam 30 determines a divergence angle of laser beam 30 that will enter second optical element 22 of beam converting optical system 20 according to the present disclosure. That is to say, as numerical aperture NA of first optical element 21 is increased, the convergence angle increases. Therefore, a divergence angle of a line beam of beam converting optical system 20 is increased although second optical element 22 does not include a plurality of concave lenses that have been conventionally used.

Beam converting optical system 20 includes two lenses, or first optical element 21 and second optical element 22. Therefore, beam converting optical system 20 is small and has a large divergence angle. First optical element 21 and second optical element 22 each have a cylindrical structure. Therefore, the optical elements are easily made. Therefore, molding process with the molding die is used to make the optical elements. The optical elements are more uniformly manufactured by the molding process with the molding die.

First optical element 21 has second optical surface 212 that is a plane. Therefore, optical properties are not influenced by second optical surface 212 that is not precisely positioned relative to first optical surface 211. Second optical surface 212 may not be precisely positioned relative to first optical element 21 when first optical element 21 is made by molding process with the molding die. That is to say, the lens of first optical element 21 is easily made by molding. Further, second optical element 22 has fourth optical surface 222 that is a plane. Therefore, optical properties are not influenced by fourth optical surface 222 that is not precisely positioned relative to third optical surface 221. Fourth optical surface 222 may not be precisely positioned relative to third optical surface 221 when second optical element 22 is made by molding process with the molding die. That is to say, the lens of second optical element 22 is easily made by molding.

Figure 5:
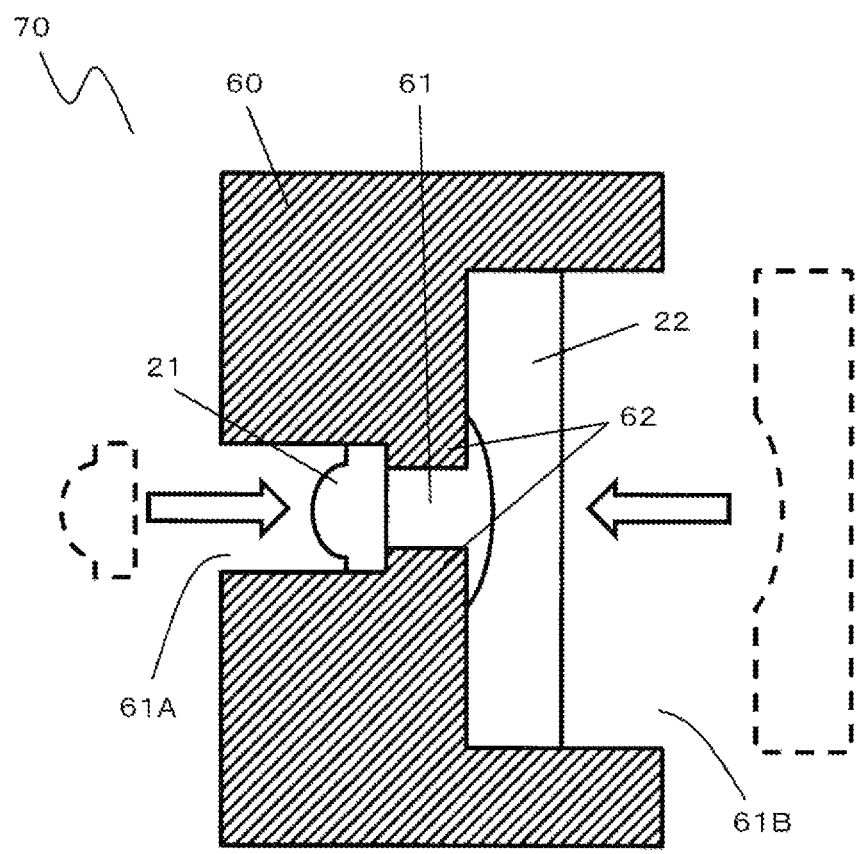
FIG. 5 is a schematic view that illustrates how an example of variation on the beam converting optical system according the present disclosure is assembled.

If a few lenses increase a divergence angle, as is the case with beam converting optical system 20, first optical element 21 and second optical element 22 need to be accurately positioned. FIG. 5 is a schematic view that illustrates how an example of variation on the beam converting optical system is assembled. Beam converting optical system 70 includes first optical element 21, second optical element 22, and lens barrel 60. First optical element 21 and second optical element 22 are inserted into lens barrel 60, and thus are positioned. Lens barrel 60 is made of metal, is tubular, and has through hole 61. Through hole 61 has a section that has opening 61A that is one of two openings of through hole 61. The section that has opening 61A corresponds to a shape of first optical element 21. Through hole 61 has a section that has opening 61B that is the other opening of through hole 61. The section that has opening 61B corresponds to a shape of second optical element 22. Protrusion 62 protrudes from an inner section of through hole 61. The inner section of through hole 61 is a section of through hole 61 between first optical element 21 and second optical element 22 that have been inserted into through hole 61. First optical element 21 and second optical element 22 are inserted into through hole 61 while first optical element 21 and second optical element 22 are guided by a surface within through hole 61. Therefore, misalignment between a non-power axis of first optical element 21 and a non-power axis of second optical element 22 is not allowed. Further, first optical element 21 and second optical element 22 are in contact with protrusion 62. Consequently, a distance between first optical element 21 and second optical element 22 is determined. Therefore, lens barrel 60 allows second optical element 22 to be easily positioned relative to first optical element 21. Therefore, when beam converting optical systems 20 are manufactured, optical properties of beam converting optical systems 20 are uniform.

The present invention reduces a number of components of a beam converting optical system. Therefore, the present invention is especially effectively applied to vehicles since small beam converting optical systems are needed for vehicles.

The invention claimed is:

1. A beam converting optical system for converting light intensity distribution of a laser beam emitted from a light source, and for converting the laser beam into a line beam, the beam converting optical system comprising:
   a first optical element; and
   a second optical element disposed at a subsequent stage of the first optical element,
   wherein the first optical element is a cylindrical lens,
   the cylindrical lens of the first optical element has a first optical surface where the laser beam enters, and a second optical surface where the laser beam exits,
   the first optical surface has positive refractive power,
   the second optical element is a cylindrical lens,
   the cylindrical lens of the second optical element has a third optical surface where the laser beam enters, and a fourth optical surface where the laser beam exits,
   the third optical surface has negative refractive power,
   the beam converting optical system further comprises a focal area at which the laser beam is converged, and
   the focal area is between the first optical surface and the third optical surface.

2. The beam converting optical system according to claim 1, wherein
   the second optical surface and the fourth optical surface are each a plane.

3. The beam converting optical system according to claim 2, wherein
   both the second optical surface and the fourth optical surface have no refractive power.

4. The beam converting optical system according to claim 1, further comprising a lens barrel that has a through hole, wherein the first optical element and the second optical element are disposed in the through hole, and the lens barrel supports the first optical element and the second optical element.

5. The beam converting optical system according to claim 1, wherein
   the first optical surface is convex.

6. The beam converting optical system according to claim 1, wherein
   the third optical surface is concave.

7. The beam converting optical system according to claim 1, wherein:
   the first optical surface has a non-power axis,
   the third optical surface has a non-power axis, and
   the non-power axis of first optical surface aligns with the non-power axis of third optical surface.

8. The beam converting optical system according to claim 7, wherein
   a range within which misalignment between the non-power axis of first optical surface and the non-power axis of third optical surface is within ±0.3°.

9. A light source device comprising:
   a light source that emits a laser beam; and
   a beam converting optical system that converts light intensity distribution of the laser beam, and converts the laser beam into a line beam,
   wherein the beam converting optical system includes:
   a first optical element; and
   a second optical element disposed after the first optical element, and
   the first optical element is a cylindrical lens,
   the cylindrical lens of the first optical element has a first optical surface where the laser beam enters, and a second optical surface where the laser beam exits,
   the first optical surface has positive refractive power,
   the second optical element is a cylindrical lens,
   the cylindrical lens of the second optical element has a third optical surface where the laser beam enters, and a fourth optical surface where the laser beam exits,
   the third optical surface has negative refractive power,
   the laser beam converges at a focal area, and
   the focal area is between the first optical element and the second optical element.

10. The light source device according to claim 9, wherein
    the second optical surface and the fourth optical surface are each a plane.

11. The light source device according to claim 10, wherein
    both the second optical surface and the fourth optical surface have no refractive power.

12. The light source device according to claim 9, further comprising a lens barrel that has a through hole,
    wherein the first optical element and the second optical element are disposed in the through hole, and
    the lens barrel supports the first optical element and the second optical element.

13. The light source device according to claim 9, wherein
    the first optical surface is convex.

14. The light source device according to claim 9, wherein
    the third optical surface is concave.

15. The light source device according to claim 9, wherein:
    the first optical surface has a non-power axis,
    the third optical surface has a non-power axis, and
    the non-power axis of first optical surface aligns with the non-power axis of third optical surface.

16. The light source device according to claim 15, wherein
a range within which misalignment between the non-power axis of first optical surface and the non-power axis of third optical surface is within ±0.3°.

* * * * *